June 10, 1952  A. W. GUSTAFSON  2,599,825
MIXING APPARATUS FOR INSECTICIDES
Filed July 25, 1950  2 SHEETS—SHEET 1
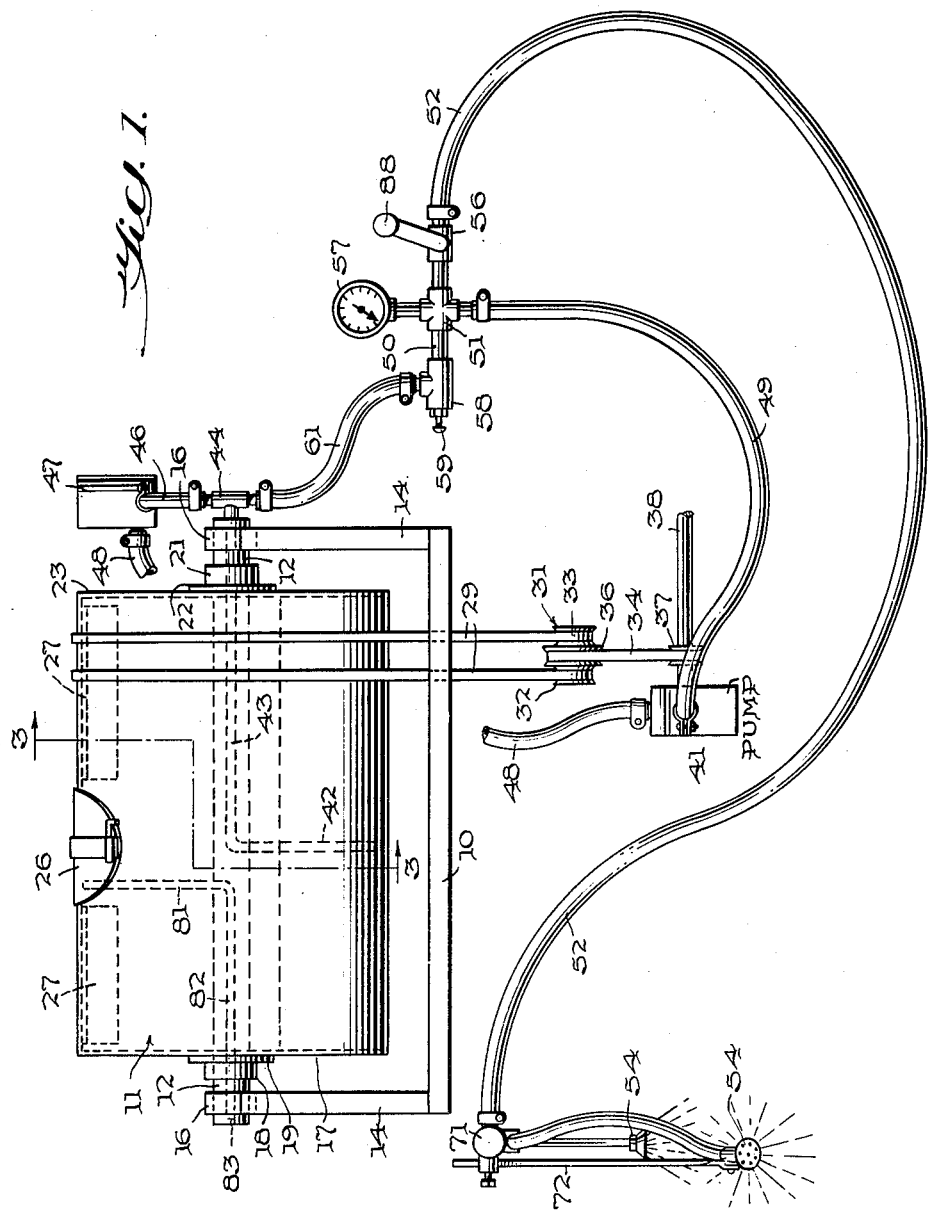
INVENTOR
AUGUST W. GUSTAFSON,
BY
ATTORNEY

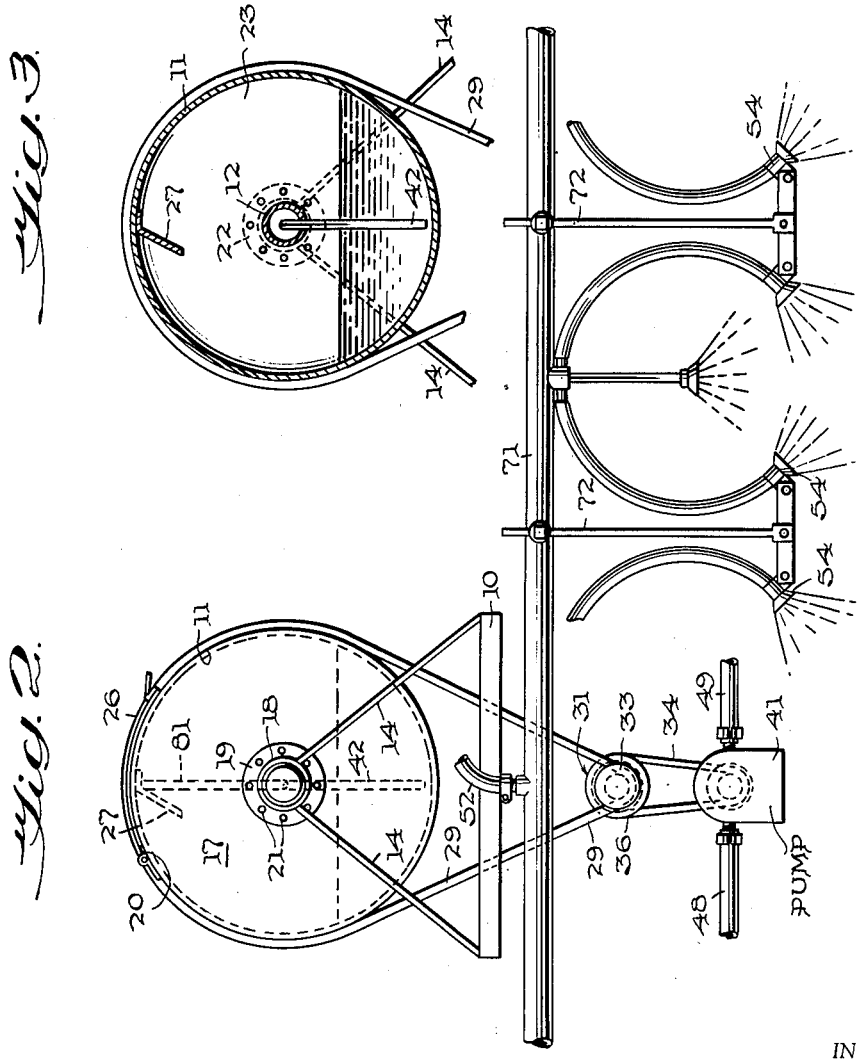

Patented June 10, 1952

2,599,825

UNITED STATES PATENT OFFICE 2,599,825

MIXING APPARATUS FOR INSECTICIDES

August W. Gustafson, Corpus Christi, Tex.

Application July 25, 1950, Serial No. 175,814

2 Claims. (Cl. 259—31)

The present invention relates to apparatus for distributing an insecticide and more particularly pertains to a mechanism for maintaining a liquid insecticide or an insecticide formed of powder and liquid in a state of agitation and delivering the liquid to one or more spraying nozzles.

An object of the invention is to provide a drum for receiving the insecticide and maintaining the insecticide and liquid carrier in a properly mixed condition so that a substantially uniform concentration of insecticide will be delivered to the vegetation of the like which is being treated.

A further object of the invention is to provide means adding air to the rotating drum as the liquid is withdrawn to thereby facilitate the discharge of the insecticide to the spraying nozzles.

Other objects and features of the invention will be appreciated and apparent to those skilled in the art upon a consideration of the following detailed description and the accompanying drawings wherein an embodiment of the invention is disclosed.

In the drawings:

Fig. 1 is a side elevational view of apparatus exhibiting the invention.

Fig. 2 is an end elevational view.

Fig. 3 is a fragmentary sectional view taken on the line 3—3 of Fig. 1.

Referring to the drawings there is shown at 10 the base of a frame for supporting a drum 11 for rotation. The drum 11 is adapted to receive a liquid insecticide concentrate adapted to be mixed with a liquid carrier or an insecticide in powder form which is adapted to be mixed with water or other liquid. The drum 11 is supported for rotation by a relatively large hollow shaft 12 which extends through the drum as indicated by the dotted lines in Fig. 1. The shaft 12 is supported by converging brackets 14 which extend upwardly from the base 10 of the frame. The pairs of brackets 14 are each provided with a collar 16 which embrace the shaft 12 and prevent rotation thereof relative to the frame.

The end wall 17 of the drum carries a bearing 18 which may be secured to the end wall by means of a flange 19. A plurality of rivets or the like 21 extend through the flange 19 to thereby secure the bearing 18 to the drum 11. A similar bearing 21 is provided at the other end of the drum which carries a flange 22. The flange 22 may be bolted or riveted to the end wall 23. The drum is supported for rotation on the shaft 12 by means of the bearings 18 and 21.

The drum 11 is provided with an opening 20 in the periphery thereof which is adapted to be closed and sealed by means of a door 26. The insecticide materials and liquid carrier therefor are introduced into the drum through the opening 20 when the door 26 is open. A plurality of paddles 27 are provided inside the drum so that during rotation thereof the insecticide materials are mixed with water or other liquid and constantly agitated while the drum rotates.

The drum 11 may be driven in any suitable manner and in the embodiment illustrated a plurality of belts 29 are trained about the periphery of the drum. These belts also extend around a pulley shown generally at 31. The pulley 31 is provided with two grooved portions for receiving the belts 29. A third intermediate groove is provided on the pulley assembly 31 which is of larger diameter than the outside pulleys 32 and 33. A belt 34 is trained about the intermediate pulley 36 and about a pulley 37 secured to a drive shaft 38. The shaft 38 may be driven by any suitable power source, such as the power take-off of a tractor or the like which is employed for pulling the insecticide distributing apparatus over the fields or the like where the vegetation is to be treated. It will be noted that the pulley 31 is devoid of bearings. The pulley assembly 31 serves the purpose of speed change between the shaft 38 and the drum 11. In addition thereto the pulley assembly 31 tends to move laterally in response to the pulling forces applied to the belts and thereby serves to automatically tighten the belts 29 and 34.

A pump 41 is driven by the shaft 38 and this pump is provided for the purpose of withdrawing liquid from within the drum 11. A pipe 42 depends from the hollow shaft 12 within the drum and the pipe 42 terminates with an open lower end adjacent the cylindrical wall of the drum as shown in Fig. 3. The pipe 42 is provided with a horizontal portion 43 which extends through the hollow shaft 12 to a position beyond the brackets 14. A T-type pipe fitting 44 is connected to the pipe 43 and a pipe or hose 46 extends from the fitting 44 to a strainer 47. A hose or flexible conduit 48 extends from the outlet of the strainer 47 to the inlet side of the pump 41. The outlet or discharge side of the pump is connected by a hose 49 to a pipe fitting 51 as shown in Fig. 1. A conduit line 52 extends from the fitting 51 to supply the insecticide to the spray nozzles. A valve 56 is provided in the line 52 to control the pressure of the liquid and the amount being forced through the hose line 52.

The discharge hose line 52 may be connected to a header 71 as shown in Figs. 1 and 2 so that the liquid insecticide under pressure may be supplied to a plurality of nozzles 54. The nozzles may be supported by means of vertically adjustable arms 72 carried by the header 71. This header structure may be mounted on the frame 10 or any other part of the vehicle for transporting the insecticide distributing mechanism.

A pressure gage 57 is provided for indicating the pressure on the discharge side of the pump 41. This gage 57 is in open communication with the pipe fitting 51. A check valve 58 is connected with the pipe fitting 51 by a short pipe 50 and this valve may be adjusted by means of a screw 59 to open when a desired predetermined pressure is attained in the pipe fitting 51. A by-pass conduit 61 connects the valve 58 to the fitting 44. Thus when the pressure in the discharge line 49 rises above a predetermined value the valve 58 opens and permits some of the liquid to return to the suction side of the pump 41.

The apparatus includes means for admitting air to the interior of the drum 11 and thereby maintaining atmospheric pressure within the rotating supply container. It is for this purpose that a vertically disposed pipe 81 extends upwardly from the hollow shaft 12. The upper end of the pipe 81 is open and terminates near the top of the drum 11 between the paths described by the agitating blades 27. The pipe 81 is provided with a horizontal portion 82 which is arranged within the hollow shaft 12 and extends outside the drum through the shaft and terminates at 83. Thus as the liquid is withdrawn from the mixing drum 11 air is admitted through the pipes 82 and 81 to maintain atmospheric pressure within the rotating drum and thereby facilitating the withdrawal of the liquid by the pump 41.

In operation the door 26 is opened and the insecticide materials are supplied into the drum. The door 26 is then closed so as to seal the periphery of the drum. The drive shaft 38 is then rotated to turn the drum and to thoroughly mix the insecticide materials with the liquid which is used as the carrier for the insecticide. The shaft 38 drives the pump 41 and the suction developed thereby draws liquid through the pipe 42 and the horizontal portion 43 thereof and the liquid moves through the strainer 47 and the hose 48. The liquid insecticide is discharged from the pump 41 through the conduit line 49 and the hose line 52 to the header 71 and the spraying nozzles. The volume of the liquid discharged through the line 52 may be controlled by adjusting the position of the handle 88 of the valve 56. In the event that the pressure within the fitting 51 rises above a predetermined value the valve 58 opens to permit the return of some of the liquid to the suction side of the pump 41.

While the invention has been described with reference to specific structural features and with regard to a particular combination of elements it will be understood that changes may be made in the general organization and in the part. Such changes and others may be made without departing from the spirit and scope of the invention as set forth in the appended claims.

What I claim and desire to secure by Letters Patent is:

1. In apparatus for mixing an insecticide with a liquid carrier and maintaining such materials in an intermingled state during distribution, a horizontally disposed cylindrical shaped drum having an opening in the periphery for receiving an insecticide material and a liquid carrier therefor, means for closing and sealing said opening, end walls for the drum, a horizontally disposed stationary shaft extending through said drum and said end walls, a bearing attached to each end wall surrounding the shaft supporting the drum for rotation about the shaft, a paddle carried by the inner periphery of the drum projecting generally radially inward therefrom and extending axially of the drum from a point adjacent one end wall and terminating short of the center of the drum, a second paddle carried by the inner periphery of the drum projecting generally radially inward therefrom and extending from a point adjacent the other end wall and terminating short of the center of the drum, said shaft having open ends outside said bearings, a withdrawal pipe extending into said hollow shaft through one open end thereof including a portion extending vertically downward from a central portion of the hollow shaft between the paths of adjacent ends of said paddles and terminating adjacent the inner periphery of the drum, an air admitting pipe extending into said hollow shaft through the other open end thereof including a portion extending vertically upward from the shaft between the paths of adjacent ends of said paddles and terminating at its free end adjacent the inner periphery of the drum, means for rotating the drum, and means for withdrawing the mixed liquid through said withdrawal pipe.

2. In apparatus for mixing an insecticide with a liquid carrier and maintaining such materials in a mixed state while being withdrawn for distribution, a horizontally disposed cylindrical shaped drum for receiving an insecticide material and a liquid carrier therefor, end walls for the drum, a horizontally disposed stationary shaft extending through said drum and said end walls, a bearing attached to each end wall surrounding the shaft supporting the drum for rotation about said shaft, a paddle carried by the inner periphery of the drum projecting generally radially inward therefrom located adjacent one end wall and terminating short of the center of the drum, a second paddle carried by the inner periphery of the drum projecting generally radially inward therefrom located adjacent the other end wall and terminating short of the center of the drum, said shaft having open ends outside said bearings, a withdrawal pipe extending into said hollow shaft through one open end thereof including a portion extending vertically downward from a central portion of the hollow shaft between the paths of adjacent ends of said paddles and terminating adjacent the inner periphery of the drum, an air admitting pipe in open communication with the other open end of the hollow shaft including a portion extending vertically upward from the shaft between the paths of adjacent ends of said paddles and terminating at its free end adjacent the inner periphery of the drum, means for rotating the drum, and means for withdrawing mixed insecticide and carrier liquid through said withdrawal pipe.

AUGUST W. GUSTAFSON.

REFERENCES CITED

The following references are of record in the file of this patent:

UNITED STATES PATENTS

| Number | Name | Date |
| --- | --- | --- |
| 588,136 | Eyles | Aug. 17, 1897 |
| 2,318,293 | Cornell | May 4, 1943 |
| 2,347,357 | Mason | Apr. 25, 1944 |